United States Patent [19]

Lang et al.

[11] Patent Number: 4,647,884

[45] Date of Patent: Mar. 3, 1987

[54] CONTROLLED TRAVEL ARTICULATED LINKAGE FOR WAVEGUIDE AND CABLING SUPPORT

[75] Inventors: Arthur D. Lang, Anaheim; James R. Moorehouse, Orange; Edwin L. O'Brien, Fullerton, all of Calif.

[73] Assignee: Hughes Aircraft Company, Los Angeles, Calif.

[21] Appl. No.: 699,625

[22] Filed: Feb. 8, 1985

[51] Int. Cl.[4] .............................................. H01P 1/06

[52] U.S. Cl. ...................................... 333/248; 248/49; 333/256; 343/719; 343/890

[58] Field of Search ............... 333/248, 249, 254, 256, 333/257; 343/719, 890; 138/106, 107, 118; 248/49

[56] References Cited

U.S. PATENT DOCUMENTS

| | | | |
|---|---|---|---|
| 2,805,401 | 9/1957 | Crowley | 333/256 |
| 4,311,293 | 1/1982 | Tenniswood | 248/49 |
| 4,392,344 | 7/1983 | Gordon | 248/49 X |
| 4,486,725 | 12/1984 | Majkrzak | 333/248 |
| 4,570,437 | 2/1986 | Moritz | 248/49 X |

*Primary Examiner*—Paul Gensler
*Attorney, Agent, or Firm*—T. A. Runk; A. W. Karambelas

[57] ABSTRACT

An articulated linkage is disclosed for supporting waveguide and electrical cabling through a predetermined range of movement. The linkage comprises a plurality of elongated rigid sections, joined by articulated joint sections. The joints comprise at least two short links which are pivotably connected to each other and the adjacent rigid sections. Travel limit pins are provided to limit the pivoting motion of the joint links relative to each other and the rigid sections. The lines of waveguide comprise respective sections of flexible waveguide passing through the flexible joints of the linkage and are connected to elongated sections of rigid waveguide which are supported by the rigid sections of the linkage. The travel limits on joint movement are selected to limit the angular excursions to protect the flexible waveguide from undue stresses during movement of the linkage. The linkage allows continuous connection of the waveguide and cabling throughout the raising and lowering of an antenna group or other microwave utilization device.

20 Claims, 13 Drawing Figures

30
55
55
50
20
25
40
45
110
120
100

30
20
25
50
55
45
120
100
40
110

28c
46°
138a
138b
28
28b
131f
131e
131a
28d
28a
131b
210c
131g
131
130
132e
138b
132a
132b
132
132c
132h
170
173
172f
171
132g

FIG. 5
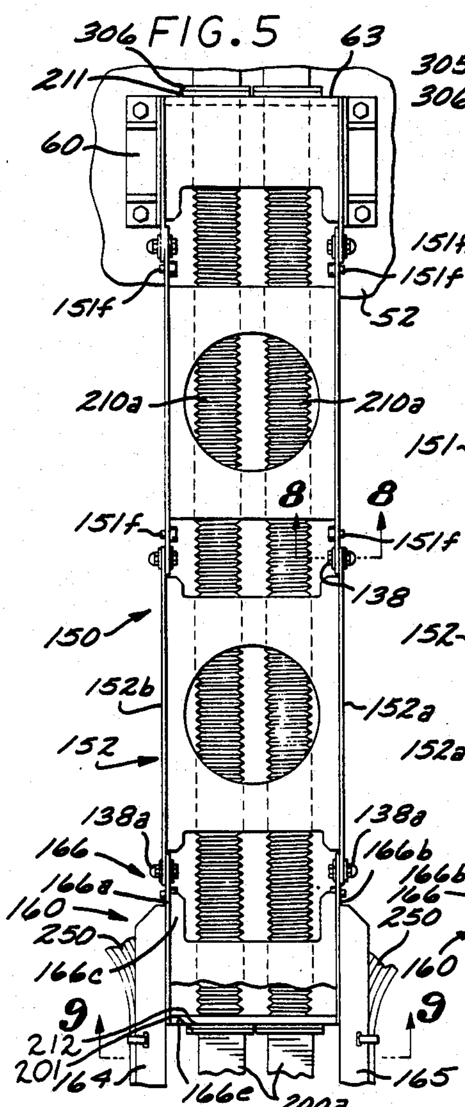
FIG. 6
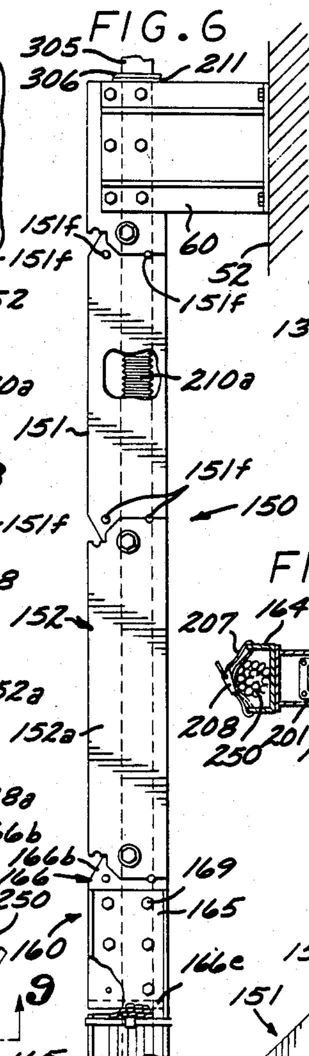
FIG. 8
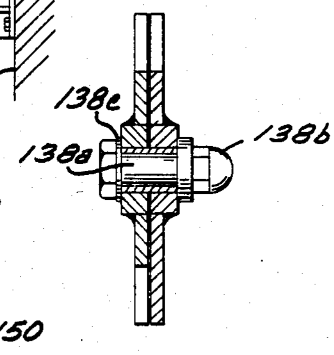
FIG. 9
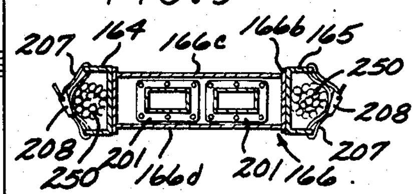
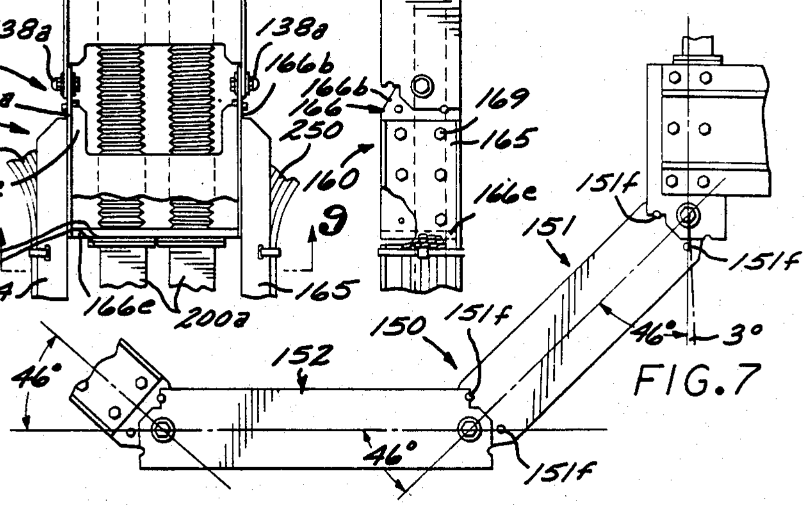
FIG. 7

CONTROLLED TRAVEL ARTICULATED LINKAGE FOR WAVEGUIDE AND CABLING SUPPORT

BACKGROUND OF THE INVENTION

The present invention relates to microwave transmission lines, and more particularly to articulating linkages for supporting waveguide transmission lines for travel through a controlled range of movement.

In some microwave rf systems, one piece of equipment is required to be electrically coupled to another piece of equipment in such a way to allow relative physical movement between the two pieces of equipment. An exemplary application is a radar system comprising an extendable antenna group which is electrically coupled to a stationary radar excitation device such as a transmitter and/or receiver. The antenna system may be stowed inside a protective enclosure or silo, and raised to a position above the enclosure to an operating position.

Reliable RF connections must be made to the antenna group from the radar excitation device when the antenna group is in the extended, raised position. Waveguide typically comprises the desired rf transmission line. Insofar as applicants are aware, in the past the waveguide lines have been connected to the antenna system after its deployment to the operating position, and vice versa, i.e., the waveguide lines have been disconnected from the antenna system prior to its retraction to the stowed position. This requires physical access to the antenna system and has been relatively time consuming and subject to electrical discontinuity problems.

It would be a valuable contribution to the art to provide a system for deploying and stowing an antenna group such that the antenna group is continuously operable, and the disconnection and reconnection procedures are no longer required.

Thus, it is a principal object of the present invention to provide a means for maintaining electrical continuity while raising or lowering waveguide transmission and cable lines.

Another object is to provide an articulated linkage for supporting an articulating waveguide line through a predetermined range of movement.

A further object is provide an articulating linkage for supporting the waveguide through a controlled range of movement to prevent overstressing the waveguide.

Yet another object is to provide a relatively strong, yet lightweight, waveguide and cabling support linkage which is adapted to follow the raising and lowering of an antenna group so that disconnection of the waveguide with a resultant loss of waveguide pressure or the necessity of disconnecting cable connectors is not required.

SUMMARY OF THE INVENTION

In order to achieve the above objects, we have developed a novel articulated linkage which can be connected between an antenna and a relative stationary point for supporting waveguide and electrical cabling, which allows for the raising and lowering of the antenna through a series of fabricated articulated joints. The waveguides are flexible at the joints, and their bend radii are controlled by the joints of the linkage, which are provided with travel limit stops to limit the bend radii. The cabling has service loops at the joints to allow for cable bending. The linkage allows the waveguide and cabling to follow the raising and lowering of an antenna group without disconnection and the resultant loss of waveguide pressure or the necessity of disconnecting cable connectors.

BRIEF DESCRIPTION OF THE DRAWINGS

These and other features and advantages of the present invention will become more apparent from the following detailed description of a preferred embodiment thereof, as illustrated in the accompanying drawings, in which:

FIG. 5 is a partial cutaway top view of one joint of the articulated linkage.

FIG. 6 is a side view of part of the joint of FIG. 5, shown in the straightened position.

FIG. 7 is a side view of the joint of the articulated linkage of FIG. 5, shown in a bent position.

FIG. 8 is a cross-sectional view of a pivot pin, taken through line 8—8 of FIG. 5.

FIG. 9 is a cross-sectional view of an elongated rigid section of the articulated linkage, taken along line 9—9 of FIG. 5.

FIG. 11 is an enlarged view of the structure indicated by phantom circle 11 shown in FIG. 10, showing the connection between a rigid waveguide section and a flexible waveguide section.

FIG. 12 is a cross-sectional view taken along line 12—12 shown in FIG. 11.

FIG. 13 is a cross-sectional view taken along line 13—13 shown in FIG. 10.

DETAILED DESCRIPTION OF THE PREFERRED EMBODIMENT

The present invention comprises a novel controlled travel articulated linkage for waveguide and cabling support. The following description is presented to enable a person skilled in the art to make and use the invention, and is provided in the context of a particular application and its requirements. Various modifications to the preferred embodiment will be readily apparent to those skilled in the art, and the generic principles defined herein may be applied to other embodiments and applications. The present invention is not intended to be limited to the embodiment shown, but is to be accorded the widest scope consistent with the principles and novel features disclosed herein.

Figure 1:
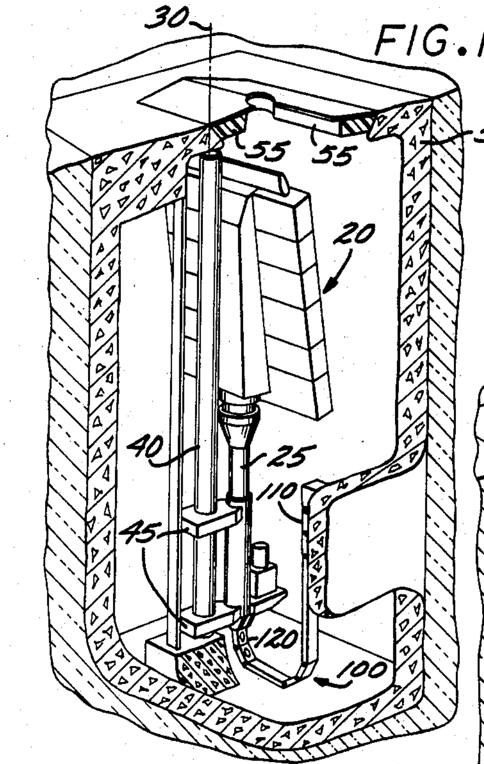
FIG. 1 is a simplified cutaway perspective view of a deployable antenna group in a stowed position within a protective silo and coupled to the articulated linkage in accordance with the invention.
Figure 2:
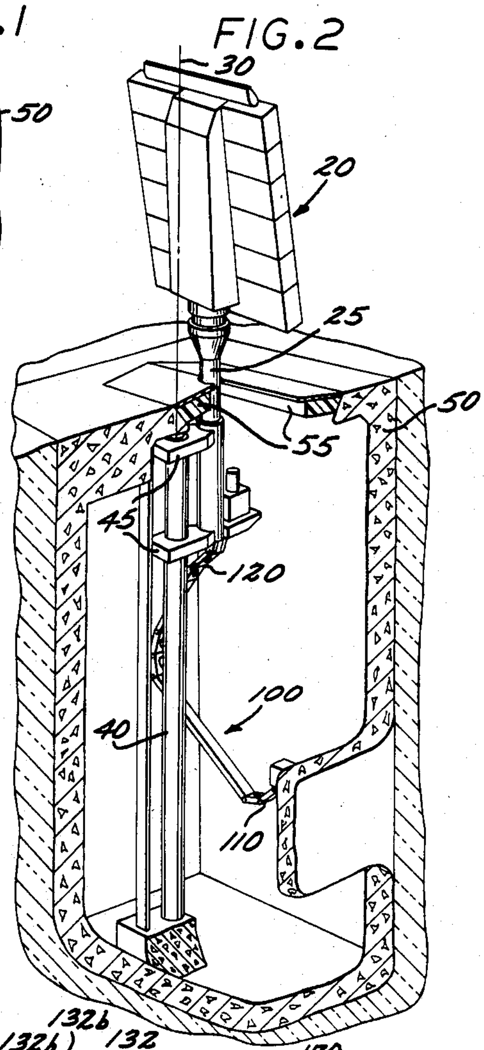
FIG. 2 is a simplified cutaway perspective view of the antenna group and articulated linkage of FIG. 1 in an extended operating position.

An application of the preferred embodiment is illustrated in FIGS. 1 and 2. These perspective cutaway drawings illustrate an antenna group 20 which is stowed within a protective silo enclosure 50 when not in use (FIG. 1), and which is deployed to a position outside the silo for operational use (FIG. 2). Antenna group 20 and mast 25 are mounted by fixtures 45 on elevator system 40 for translation movement along axis 30. Thus, fixtures 45 are adapted to carry the antenna group 20 upwardly or downwardly along axis 30, as the elevator moves up or down. The elevator system for raising and lowering the antenna system is conventional in design and the details thereof form no part of the novelty of the present invention.

It is necessary to electrically connect the antenna group 20 to a remotely located radar utilization apparatus (not shown) located outside the silo. The electrical connection includes waveguides for transmission of rf signals, and also typically requires basic electrical power transmission, for example, through cables. In the disclosed embodiment, the waveguide lines are made with S band rectangular waveguides, having nominal cross-sectional dimensions of $1\frac{1}{2}$ by 3 inches. The present invention overcomes the problem discussed in the Background of providing the required rf and electrical connections at both the stowed position and the extended position.

In accordance with the invention, an articulated linkage 100 supports the waveguide and cables necessary for continuous electrical connection of the antenna group 20 to the radar utilization device. The linkage 100 is supported at end 110 by connection to a fixed location at one wall of the silo 50, and at end 120 to the base of the mast 25 which supports the antenna group 20. The linkage 100 is adapted to follow the up and down movement of the antenna group 20 as it is deployed to or from the extended position. Thus, FIG. 1 illustrates the antenna group 20 in its stowed position, and FIG. 2 illustrates the antenna group 20 in the deployed position. It is noted that a pair of silo doors 55 are adapted to open to allow the deployment of the antenna group 20.

Figure 4:
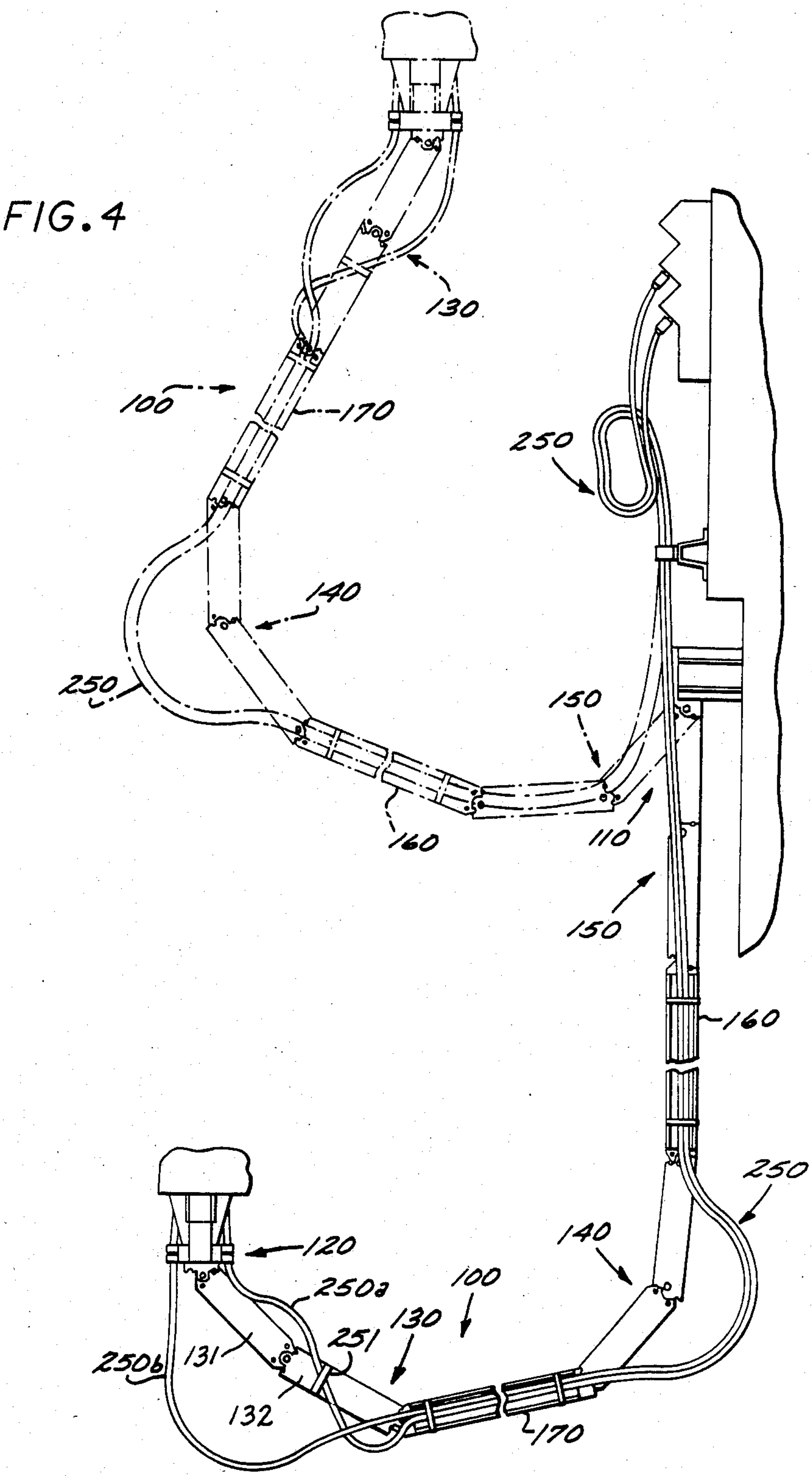
FIG. 4 is an elevation view of the articulated linkage shown in the stowed configuration (solid lines) and in the extended position (dashed lines).

Referring now to FIG. 4, the articulated linkage 100 is disclosed in the stowed position (solid lines) and in the extended position (dashed lines). In order to accommodate the up/down travel to the antenna group, the linkage comprises three flexible joints 130,140 and 150. The three joints are connected by extended rigid sections 160,170. The drawing is not to scale, as the extended rigid sections 160,170 may typically be quite long. In the preferred embodiment, section 160 is about 181 inches in length between pivot connections to the adjacent joints, and rigid section 170 is about 71 inches in length between corresponding pivot connections. The individual links of each joint are 24 inches in length in the preferred embodiment.

Linkage 100 carries two extended waveguide lines (not visible in FIG. 4), each of S band size ($1\frac{1}{2}$ by 3 inches in cross-section). The waveguide runs comprise lengths of rigid waveguide carried in the extended rigid sections 160,170. The waveguide runs further comprise lengths of flexible waveguide carried in the respective joints.

As is known to those skilled in the art, the waveguide runs may be pressurized to prevent the admission of moisture or other contaminants into the waveguides, which could otherwise lead to impairment in performance or equipment failures. To maintain pressurization the waveguide lines must be substantially airtight. Thus, in maintaining pressurization and low loss electrical continuity, it is important that the waveguide runs not be subjected to stresses which will cause the waveguide, and particularly the flexible sections, to crack or break. As will be described in greater detail below, the linkage joints are adapted to limit the amount of bend of the flex waveguide at each joint to prevent overstressing the flexible waveguide.

Exterior cable support channels are provided on each side of the rigid sections of the linkage to support cable bundles 250; service loops are formed at the joints of the linkage. It is noted that the respective cable bundles 250 are split into two sub-bundles **250*a*, 250*b* adjacent joint 130 as shown in FIG. 4. Each sub-bundle 250*a* forms an "s" shaped loop, and is tied to link 132 by cable fastener 251. Each sub-bundle 250*b* is looped free of the joint 130**. Separating the cable bundles into sub-bundles facilitates connection of the cables at the antenna, and also facilitates bidirectional joint movement.

Figure 10:
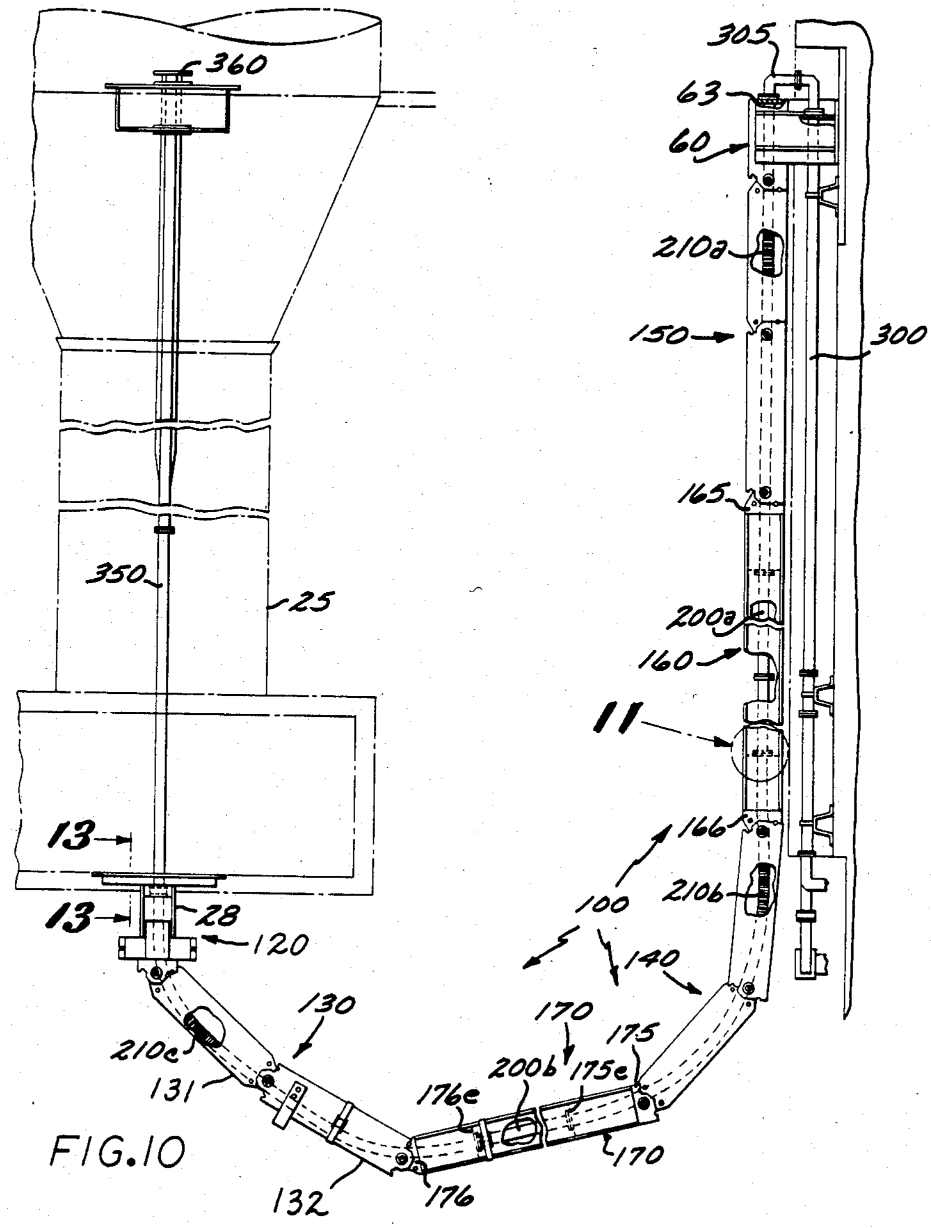
FIG. 10 is a partial side view of the articulated linkage illustrating the connections to the antenna mast and silo wall, and showing in dashed lines the waveguide lines supported by the linkage.

Referring now to FIG. 10, a side view of the articulated linkage is shown, with the antenna group in the stowed position. Two side-by-side waveguide transmission lines are supported within the linkage in the disclosed embodiment. One waveguide line comprising waveguide sections **210*a*, 200*a*, 210*b*, 200*b*, 210*c* is shown in FIG. 10, and is coupled at flange 63 to a feed waveguide 300 running from the radar utilization device (not shown). At the other end 120 of the linkage, the waveguide line 200*c* is coupled at support plate 27 of FIG. 13 near the base of the antenna mast 25 to a feed waveguide 350 which extends to the feed port 360** for the antenna group.

Bracket 28 moves with the elevator, carrying the linkage 100 along with it. Generally, the linkage 100 comprises flexible joints 130,140 and 150, which couple together rigid, elongated sections 160,170. In the embodiment shown, the ends of the rigid sections comprise clevises which are connected to the joints by pivot pins to allow pivotal movement. The joints themselves comprise two relatively short rigid link units which are pivotably connected by pivot pins.

The rigid sections 160,170 of the linkage each comprise a pair of elongated u-shaped channel members formed from extruded aluminum. These channel members define the sides of the elongated sections. A clevis member is disposed at each end of the elongated members. The clevis members are the structural elements to which the channel members are bolted. For example, clevis 166 is typical of a clevis usable in the invention, and is shown in FIG. 5, with further details thereof in FIGS. 6 and 9. Clevis 166 comprises a pair of side pieces **166*a*,166*b*, upper and lower lateral strengthening plates 166*c*,166*d* extending between the side pieces, and a lateral upright waveguide support flange 166*e*, all of which may be fusion welded to form the clevis. Respective ends of the side pieces are bored to accept the pivot bolts 138*a* connecting the joints to the rigid sections. Each side of each clevis is also provided with six bores to accept six fastening bolts 169 for fastening the channel members 164,165** to each respective side of the clevis.

Top and bottom plates are bolted adjacent each end of the rigid sections 160,170 to the channel members 164,165 to provide additional tortional rigidity. The fastening bolts are passed through corresponding bores formed in the plates and channel members. In the disclosed embodiment, these top and bottom plates are approximately 17.5 inches long and 8 inches wide, and are fabricated from sheets of aluminum about 0.190 inches in thickness.

Figure 3:
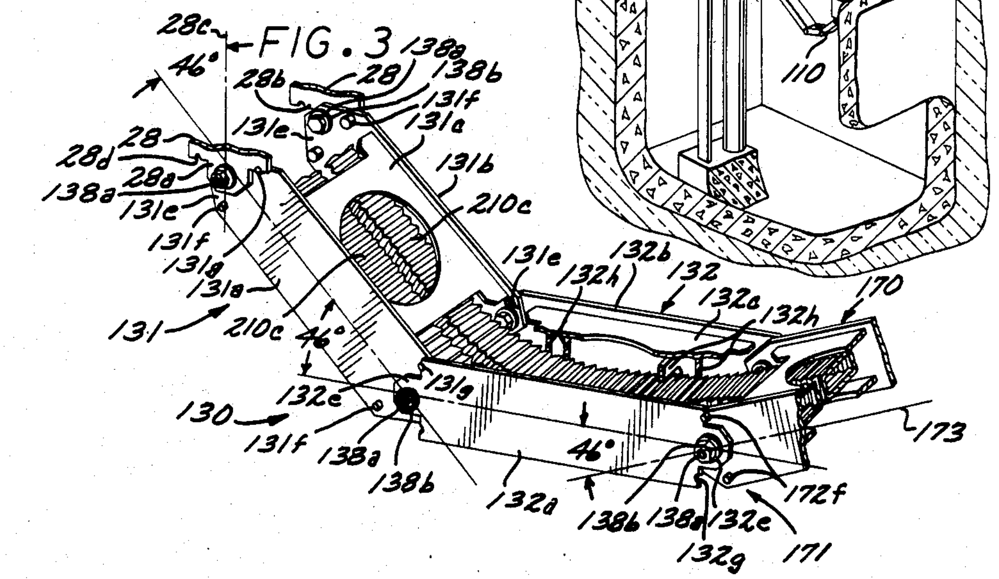
FIG. 3 is a partial cutaway perspective view of one joint of the articulated linkage.

The rigid sections are therefore fabricated to provide a rigid and strong, yet lightweight, support structure. The joints of the linkage are similarly constructed to provide lightweight, structural elements. As shown in FIGS. 3 and 10, joint 130 comprises two rigid link units 131,132. One end of link unit 131 is pivotably coupled to bracket 28 attached to the bottom of the mast 25 (FIG. 10) by a pair of pivot bolts each secured by a threaded nut. Similarly, one end of link 32 is pivotably coupled to end 171 of elongated rigid section 170 by a pair of pivot bolts each secured by a threaded nut.

Link 131 is typical of the link units of the joints, and comprises a pair of side members 131*a*, 131*b*, and top member 131*c* and bottom member 131*d* (not shown in FIG. 3). Each of the four members is fabricated from aluminum alloy plate material in this embodiment. The top and bottom members 131*c*,131*d*, respectively, add strength and rigidity, and are joined to the respective side members 131*a*,131*b* by conventional means, such as fusion welding. To lessen the weight of the linkage, the top and bottom members 131*c*,131*d* have circular openings formed therein.

Four lateral support truss members 132*h* are secured by fusion welding perpendicular to the side members and the top and bottom members of the link units, two adjacent each end of the link unit. For example, the truss members 132*h* of link unit 132 are shown in breakaway view in FIG. 3. The truss members add to the strength and rigidity of the link units. A large open channel of rectangular cross-section is defined by the truss members and the bottom members of the link units, and the two flexible waveguides 210*c* are carried in this channel.

The flexible waveguide sections employed in the preferred embodiment are each six feet in length, and are available from the Airtron Division of Litton Systems, Morris Plains, N.J., as part number 123718. As will be appreciated by those skilled in the art, these flexible waveguide sections are limited in their flexibility, since they are formed from accordion-like sections of cartridge brass or similar material. The sections are subject to metal fatigue caused by undue stress and movement, which can result in breaks or other failures in the flex waveguide section. Such breaks would impair the electrical performance of the waveguide transmission link, and could lead to loss of waveguide pressurization.

An important aspect of the invention is the provision of a means for limiting the amount of bend of the joints of the linkage so as to prevent damage to the flex waveguide members carried by the joints. The travel limit means is illustrated, for example, in FIG. 3 with respect to joint 130. The side members 132*a,b* are provided with ears 132*e* extending from either end thereof, and are bored to form a suitably sized opening to receive pivot bolts 138*a*. The bolts 138*a* provide pivot points for allowing link unit 132 to pivot freely about the end 171 of rigid section 170 and about link unit 131.

The side members 131*a,b* of link unit 131 are provided with tapered ends 131*e* which extend from either end thereof and having suitably sized openings to receive corresponding pivot bolts 138*a*. The external width (13.54 inches) of link unit 131 is slightly smaller then the internal width dimension (13.62 inches) of adjacent link unit 132 between ears 132*e*, so that ends 131*e* of link unit 131 fit between ears 132*e* of link unit 132, allowing pivot bolts 138*a* to be passed through the corresponding openings in ends 131*e* and ears 132*e* and fastened with nuts 138*b*. Thus, a pivotable connection is made between the link units 131, 132 of joint 130.

A similar pivotable connection is provided between mounting bracket 28 coupled to the base of the antenna mast and link unit 131. Bracket 28 comprises respective side members 28*a*,28*b* which are spaced apart (13.62 inches) so as to receive the tapered ends of the side members of link unit 131. Pivot bolts 138*a* are passed through corresponding bores formed in the side members of brackets 28 and link unit 131.

Pairs of travel limit pins 131*f* and 131*g* are provided through respective sides of the tapered ends 131*e* of link unit 131. These pins cooperate with semicircularly relieved areas 28*d*,132*g* in the respective ear sections of the side members of bracket 28 and link unit 132 to limit the pivotal excursions about pivot pins 138*a*. Each of the pivots of link unit 131 is constrained for maximum excursion of about 46° in either direction from the straightened position for the joint. The maximum allowable angular excursions in one direction are illustrated in FIG. 3. It has been found that limiting the bend to less than 46° for the disclosed joint configuration results in a rugged linkage able to withstand repeated movement.

In the preferred embodiment, pins 131*f* and 131*g* are fabricated from 0.500 inch diameter steel pins. The pins at the maximum travel contact corresponding semicircular, relieved areas of the ends of side pieces 28*a,b* and 132*a,b*. In a similar fashion, travel limit pins 172*f* are placed at appropriate positions adjacent the tapered ends 171 of the sides of the clevis comprising the end of extended rigid section 170. These pins 172*f* limit the maximum angular excursion of the link unit 132 to about 46° from either side of the axis 173 of the rigid section 170. The pins 172*f* cooperatively engage semicircular relieved areas 132*g* formed in side members 132*a* and 132*b* adjacent ears 132*e*.

Joints 140 and 150 are similar in construction to joint 130, except that travel about the pivot points is constrained to allow travel in substantially only one direction from the straightened position. FIGS. 5–9 illustrate articulated joint 150 in further detail. In a manner similar to connection of joint 130 to mast base bracket 28, joint 150 is pivotally coupled to bracket 60, affixed to wall 52 of the silo. As shown in FIG. 6, rigid waveguide member 305 is connected to flexible waveguide 210*a* at flanges 211,306 by conventional connections. A support plate 63 supports the flanges at their connection. Waveguide 305 comprises a waveguide transmission line coupled to the radar utilization device (not shown). The opposite end of the flexible waveguide section 210*a* is terminated in a mounting flange 212. Connection is made between flex waveguide 210*a* and rigid waveguide 200*a* by bolting together the respective flanges 212,201. As will be described in connection with FIG. 10 et sequence, the connection of the two flanges is supported by waveguide support flange 166*e* of the clevis 166 comprising rigid section 160.

Joint 150 is constrained for movement in substantially only one direction away from the straightened position shown in FIG. 6, i.e., away from silo wall 52. The travel limit stop pins 151*f* in link unit 151 and the corresponding end sections of the adjacent link unit 152 are cooperatively configured so that very little joint movement (about 3°) is allowed in the direction toward the silo wall 52. This is accomplished by appropriate relative location of the travel limit pins 151*f* in unit 151 in relation to the corresponding edges of the adjacent link unit 152.

FIG. 7 shows joint 150 in the fully bent position away from silo wall 52. As indicated, the respective travel stop pins 151*f* limit the maximum angular excursion in the direction away from the wall to about 46°. In the direction toward the wall, the angular excursion is limited to about 3°, to prevent the linkage 100 from contacting the wall. This non-symmetrical travel limit is accomplished by the non-symmetrical configurations of the ends of side member 152*a*,152*b* of link unit 152. Instead of fashioning symmetrical ear members as employed in link unit 132, the corner of the ends of side members 152*a,b* adjacent the silo wall are squared off, while the other corners are tapered.

FIG. 8 is a cross-sectional view of a shoulder bolt and self-locking nut which are employed in the preferred embodiment as the joint pivot 138*a* and locking member 138*b*. The shoulder bolt is fitted with a flat washer 138*c* and inserted through corresponding bores formed in the overlapping ear sections of the links. As indicated in FIG. 8, the side members through which the bolt is inserted are reinforced around the pin opening.

FIG. 9 is a cross-sectional view of the elongated rigid section 160 of the linkage, taken along line 9—9 of FIG. 5. The flanges 201 of the rigid waveguide sections 200*a* (FIG. 10) are visible in the cross-sectional view, secured to the lateral support flange 166*e* (FIG. 5) of the clevis 166 (FIG. 5). Elongated channel members 164,165 are bolted to the outside of the respective side members 166*a*,166*b* comprising clevis 166. The channel members 164,165 provide support for electrical cable bundles 250 which are fastened in the respective channels by straps 207. It will be noted that the joints 130,140,150 are not provided with corresponding channel members for carrying the electrical cable bundles. As illustrated in FIG. 4, the cable bundles are looped free of the joints in service loops, so that the cables do not bind the joints and are not themselves overly stressed by the movement.

FIG. 9 shows the strapping of the cable bundle 250 into the channel defined by the channel members 164,165 of rigid section 160. A strap tightener 208 is employed to tighten the strap 207, passed through strap openings (not shown) formed in the sides of the channel member, about the cable bundle 250.

In the side elevation view of FIG. 10, one of the waveguide lines carried by linkage 100 is shown in dashed lines. The waveguide carried by the linkage is coupled at the silo wall to rigid waveguide 305, which is coupled to the radar utilization device (not shown). Thus, flex waveguide section 210*a* is mated to waveguide 305 via corresponding flanges, bolted together and to support plate 63 comprising mounting bracket 60 (see also FIG. 6). The other end of flex waveguide 210*a* is fastened via corresponding flanges to rigid waveguide section 200*a*. The connection of these two waveguide sections is supported by the waveguide support flange 165*e* of clevis 164,165 of the rigid section 160 (see FIG. 11).

Due to the length of the rigid section 160, the rigid waveguide section 200*a* may be comprised of a plurality of connected rigid waveguide sections; one connection between two such rigid sections is such in the cutaway section of rigid section 160 shown in FIG. 10.

The rigid waveguide section is in turn coupled to flex waveguide section 210*b*. FIGS. 11 and 12 illustrate the details of the connection between waveguide sections 200*a* and 210*b*. The waveguide members are each terminated in corresponding waveguide flanges 201,211. The flanges are of conventional design, with a fastener opening pattern formed around the periphery thereof. A plurality of threaded fasteners 203 are employed to fasten together respective mating surfaces of the waveguide flanges. The threaded fasteners also extend through a corresponding opening pattern formed in waveguide support flange 165*e*.

FIG. 12 is a cross-sectional view illustrating the support flange 165*e* and the fastened positions of the waveguide flanges. As shown in this figure, the support flange is provided with a T-shaped opening 165*f*. The two flex waveguides 210*a* may be inserted sideways one after the other into opening 165*f* and then rotated 90° to their inserted positions shown in FIG. 12 in the truss 165*e*. The corresponding flanges of the rigid waveguides 200*a* are then brought into position against the flanges 211, and the threaded fasteners inserted through the corresponding opening patterns in the flanges 201,211 and support flange 165*e*, and secured in position with nuts.

In a similar fashion as shown in FIG. 10, the flex waveguide 210*b* is also coupled to rigid waveguide section 200*b* at the waveguide support flange of the corresponding clevis 176 for the adjacent end of rigid section 170. The opposite end of rigid waveguide 200*b* is fastened similarly to flex waveguide 210*c* at a corresponding waveguide support flange of clevis 176. Finally, flex waveguides 210*c* are connected to rigid waveguide sections 350 which run through the antenna mast from the base to a feed port connection 360 for the antenna group (not shown in FIG. 10).

FIG. 13 is a cross-sectional view taken along line 13—13 of FIG. 10, and illustrates the connection of the flexible waveguide 210*c* to corresponding rigid waveguide 350 at the base of the antenna mast 25. Flange 27 supports the connection of the corresponding waveguide flanges for waveguides 210*c* and 350. It is noted that the flange 27 must be adapted to support the weight of the linkage and the supported waveguide and cables.

The preferred embodiment of the linkage is adapted to accommodate a maximum excursion of the antenna mast of about 496 inches above the stowed position exhibited in FIGS. 1 and 10. In this embodiment, the rigid link 160 in the stowed position is disposed approximately parallel to the antenna mast. Rigid waveguide sections 200*a*,200*b* are respectively 78.5 inches and 47 inches in length. Flex waveguides sections 200*a*,200*b*,200*c* are each six feet in length. The joint travel limit means are adapted to limit the minimum joint bend radius to approximately two feet, i.e., the joints are constrained to bend radii larger than two feet. This minimum bend radius is cooperatively selected in accordance with the flexibility and of the flex waveguide, to prevent overstressing the waveguide. The specific dimensions and bend radii employed in the described embodiment are, of course, specifically adapted to the particular application described herein.

It is understood that the above-described embodiment is merely illustrative of the many possible specific embodiments which can represent principles of the present invention. Numerous and varied other arrangements can readily be devised in accordance with these principles by those skilled in the art without departing from the spirit and scope of the invention.

What is claimed is:

1. An articulated waveguide and support structure for allowing constrained travel through a predetermined range of movement, comprising:

a waveguide line, comprising connected rigid and flexible waveguide sections;

a rigid linkage section adapted for supporting said rigid waveguide section and comprising first and second clevis members disposed at opposing ends thereof, and further comprising first and second elongated side members fastened to each of the clevis members, each side member having a u-shaped cross-sectional configuration in which electrical cabling may be disposed;

a plurality of joint members for coupling to respective ends of said rigid linkage section, said joint members each adapted for movement through a predetermined angular travel and adapted to support the flexible waveguide section; and joint travel limiting means for limiting the angular excursion of each joint member to less than a predetermined amount.

2. An articulated waveguide and support structure adapted to couple to and follow an extendable antenna system as it is deployed through its range of movement, comprising:

a waveguide transmission line, comprising a plurality of alternating rigid and flexible waveguide sections coupled to said antenna system; and an articulated support linkage for carrying the waveguide line, comprising, (i) at least one rigid section, comprising a pair of elongated side members each having a u-shaped cross-sectional configuration and a pair of clevis members disposed at opposing ends of the rigid section, the rigid section adapted to carry a rigid waveguide section;

(ii) at least one articulated joint section adapted to carry a flexible waveguide section, comprising at least two pivotably connected rigid link units, and means for pivotable connection to said clevis member of said rigid section; and (iii) travel limit means for limiting the amount of movement of said joint section to a predetermined maximum allowable excursion to prevent overstressing the waveguide line.

3. The invention of claim 2 wherein said linkage comprises first and second rigid sections and first, second and third joint members, and wherein said first joint member is adapted for pivotable connection to a linkage mounting bracket and is also coupled to said first rigid section, said second joint member couples said first and second rigid sections, and said third joint member couples the second rigid section to the antenna system, whereby the waveguide and linkage is adapted to follow the antenna system as it is deployed through its range of movement.

4. The invention of claim 3 wherein each of said link units comprise a pair of side members and a plurality of lateral truss members joining said side members.

5. The invention of claim 4 wherein a plurality of aligned openings are formed in said truss members so as to receive therethrough at least one of said flexible waveguide seetions.

6. The invention of claim 5 wherein said link units further comprise upper and lower members substantially comprising plates of rigid material, and whereby said side members, said truss members and said upper and lower members cooperate to form a rigid yet lightweight link unit.

7. The invention of claim 2 further comprising electrical cables carried by the linkage in the u-shaped channels of the elongated side members of each rigid section, and wherein the linkage further comprises cable retaining means for retaining the cables in position within said channels.

8. The invention of claim 2 wherein the cables are looped in service loops adjacent the joints to allow substantially free movement of the joint members.

9. The invention of claim 2 wherein said travel limit means comprises stop pins disposed adjacent each pivotal connection of said joint sections and corresponding stop surfaces formed in the adjacent clevis member at the predetermined maximum excursion so as to stop travel about said pivotal connection once the maximum allowable excursion has been made.

10. The invention of claim 9 wherein said maximum allowable excursion represents an angular excursion of about 46° about said pivotal connection from a straightened position.

11. An articulated waveguide and support structure adapted for connection between a stationary point and a moveable antenna system, comprising:

at least one waveguide transmission line, comprising a plurality of connected rigid and flexible waveguide sections; and an articulated support linkage for carrying the waveguide line, comprising:

(i) at least two elongated rigid linkage sections, each comprising a pair of elongated side members disposed in substantially parallel relationship, each having a u-shaped cross-sectional configuration to define an outwardly facing channel, and first and second clevis members disposed at opposing first and second ends of the rigid section and connected to said side members;

(ii) at least first, second and third articulated joint sections, each adapted to carry a flexible waveguide section, comprising two pivotably connected rigid link units comprising a pair of side members and a plurality of lateral truss members joining the side members and having a plurality of aligned openings formed therein to accept therethrough at least one of said flexible waveguide sections;

(iii) first pivotal connection means for pivotably connecting a first end of said first joint section to said stationary point;

(iv) second pivotal connection means for pivotably connecting a second end of said first joint section to said first end of said first rigid linkage section;

(v) third pivotal connection means for pivotably connecting said second end of said first rigid linkage section to a first end of said second joint section;

(vi) fourth pivotal connection means for pivotably connecting a second end of said second joint section to said first end of said second rigid linkage section;

(vii) fifth pivotal connection means for pivotably connecting a first end of said third joint section to said second end of said second rigid linkage section;

(viii) sixth pivotal connection means for pivotably connecting a second end of said third joint section to said antenna system;

(ix) first, second, third, fourth, fifth, and sixth travel limit means for limiting the amount of pivotal movement of the respective first, second, third, fourth, fifth and sixth pivotal connection means so as not to exceed predetermined travel limits to prevent over stressing the waveguide line; and (x) seventh and eight and ninth travel limit means for limiting the amount of pivotal movement about the pivotal connection of the respective two rigid link units of said first, second and third joint sections so as not to exceed predetermined travel limits to prevent overstressing the waveguide line.

12. The invention of claim 11 wherein said clevis members of said rigid linkage sections comprise first and second side pieces aligned in a substantially parallel relationship and coupled respectively to said first and second elongated side members of the rigid linkage section, and a lateral waveguide support flange fixed between the side pieces and arranged for supporting said waveguide line.

13. The invention of claim 12 wherein said waveguide flanges of said clevis members define at least one opening adapted to receive one of said waveguide sections and to support the connection between respective ones of said rigid and flexible waveguide sections.

14. The invention of claim 13 wherein said flexible and rigid waveguide sections comprise terminating waveguide flanges, and wherein said waveguide support flange is adapted to receive threaded fasteners which matingly join adjacent waveguide flanges of said rigid and flexible waveguide sections.

15. The invention of claim 11 wherein said support linkage is further adapted to support electrical cables carried in the channels defined by said u-shaped side members comprising said rigid linkage sections, and wherein said cables are looped in service loops about the joint section to facilitate flexing of the joint sections.

16. The invention of claim 11 wherein each of said pivotal connection means comprises a pair of aligned pivot bolts which are passed through corresponding pivot bolt openings formed in such joined ends and secured in place by threaded fasteners.

17. The invention of claim 11 wherein each of said travel limit means comprises at least one pair of cooperatively arranged stop elements arranged on the pivotably connected elements so that, upon reaching the maximum allowable pivotal excursion of the corrected elements from a straightened position, said stop elements contact one another to prevent further angular movement.

18. The invention of claim 17 wherein said pair of stop elements comprise a stop pin disposed adjacent one end of one pivotally connected element and a corresponding relieved area formed adjacent an end of the other pivotally connected element.

19. The invention of claim 11 wherein said support linkage is adapted to carry two waveguide lines aligned in a substantially parallel relationship.

20. The invention of claim 19 wherein said clevis members of the rigid linkage sections comprise a lateral waveguide support flange arranged for supporting said waveguide lines, said flange defining a T-shaped opening adapted to receive respective sections of said waveguide lines.

* * * * *